April 7, 1925.

E. L. AVERA

AUTOMOBILE TIRE RIM

Filed May 5, 1924

Inventor

Edgar L. Avera

By Ritter & Mechlin his Attorneys

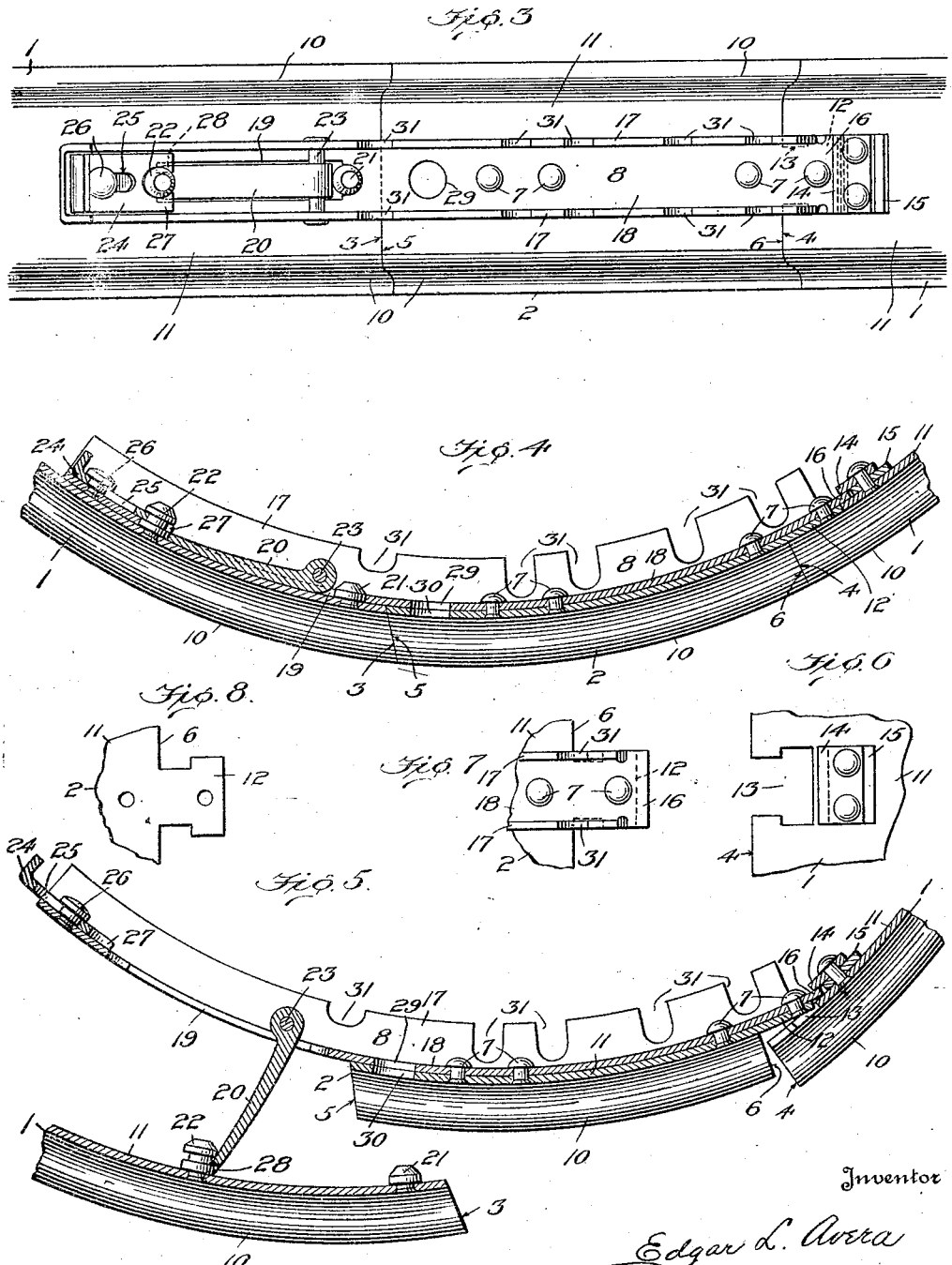

Patented Apr. 7, 1925.

1,532,569

UNITED STATES PATENT OFFICE.

EDGAR L. AVERA, OF FORT VALLEY, GEORGIA, ASSIGNOR TO INTERLOCKING TOGGLE RIM COMPANY, INC., OF FORT VALLEY, GEORGIA, A CORPORATION OF GEORGIA.

AUTOMOBILE TIRE RIM.

Application filed May 5, 1924. Serial No. 711,221.

*To all whom it may concern:*

Be it known that I, EDGAR L. AVERA, a citizen of the United States, residing at Fort Valley, in the county of Houston and State of Georgia, have invented certain new and useful Improvements in Automobile Tire Rims; and I do hereby declare the following to be a full, clear, and exact description of the invention, such as will enable others skilled in the art to which it appertains to make and use the same.

My invention relates to rims for automobile tires and particularly to the type of rim involving separable arcuate segments capable of being disconnected to facilitate the mounting and demounting of tires and which may readily be restored to normal assembled relation affording proper and adequate support for the tire mounted thereon.

A primary object of the invention is to provide an automobile rim having a detachable rim section which is firmly secured in position to complete the rim by simple and efficient means.

Another object of the invention is to provide a strong, simple and easily manufactured rim consisting of a few rugged parts.

A further object of the invention is to form and relate the several parts of the rim in such manner that the manipulations of the detachable rim section necessary to permit the mounting and demounting of tires may be easily and quickly performed with safety and certainty of operation.

A still further object of the invention is to produce an economically practical rim of the type indicated which is universally applicable to all of the standard forms of wheels at present in common use.

One of the principal features of the invention, generally stated, consists in constructing the rim with a major section having a gap therein for receiving a detachable rim section, the latter being provided with a circumferential extension terminating in a stepped end which interlockingly engages correspondingly formed parts of the major rim section, and the detachable rim section and its extension being associated with a pivoted member so as to constitute a toggle mechanism which is operable to force the detachable rim section into the gap in the major rim section.

Another primary feature of the invention consists in providing the detachable rim section with a circumferentially extending felly bridge forming a part of the toggle mechanism for actuating said rim section, the felly bridge being formed with an aperture adapted to receive a valve stem and being also provided with a series of circumferentially spaced openings each adapted to receive a transversely extending bolt for forming a connection with a wheel, and the valve stem aperture being positioned between a plurality of the bolt receiving openings.

Other features of invention residing in advantageous details of construction and particular relations of elements will hereinafter appear and be pointed out in the claims.

In the drawings illustrated a preferred embodiment of the invention:—

Figure 3 is a detail plain view of a portion of the rim, showing the assembled relation of the detachable rim section to the major rim section.

Figure 4 is a central circumferential section of the construction shown in Fig. 3.

Figure 5 is a view corresponding to Fig. 4 but representing the positions assumed by the detachable rim section and associated parts when the rim is collapsed for the purpose of mounting or demounting a tire.

Figure 6 is a detail plan view of a portion of one end of the major rim section.

Figure 7 is a detail plan view of the adjacent end portions of the detachable rim section and felly bridge.

Figure 8 is a detail plan view of the end portion of the detachable rim section shown in Fig. 7.

Figure 1:
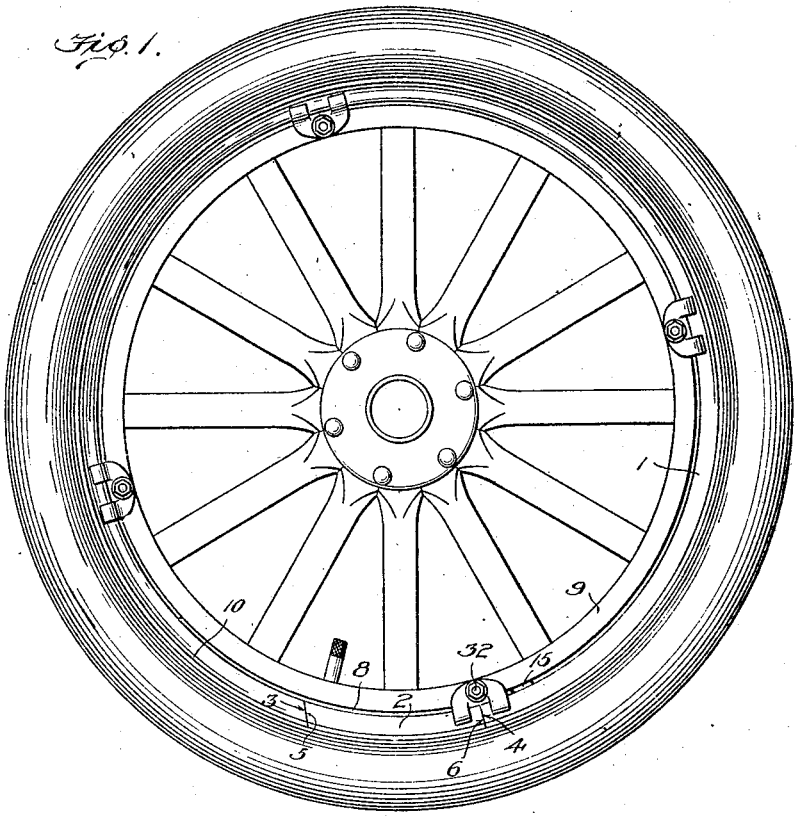
Figure 1 is a side view of a wheel having an automobile tire rim embodying the invention applied thereto.
Figure 2:
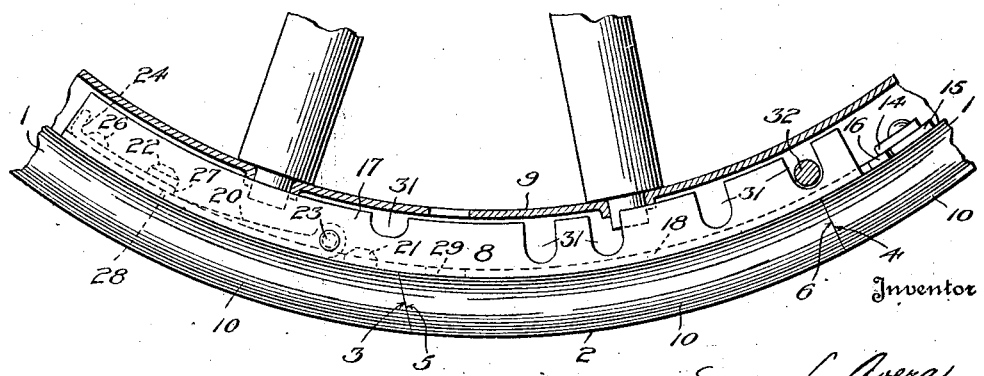
Figure 2 is a detail view, partly in side elevation and partly in section, of a detachable rim section and adjacent portions of the principal rim section and the wheel.

The tire supporting rim comprises a major rim section 1 and a detachable rim section 2 which is adapted to fit in between the ends 3 and 4 of the major section so as to complete the rim. In order that the removable section 2 of the rim may be assembled with and disassociated from the principal rim section 1, the abutting ends 3 and 5 of the rim sections are correspondingly inclined or beveled, while the other abutting ends 4 and 6, respectively, of the rim sections preferably extend radially.

Rigidly attached to the inner side of the detachable rim section 2, as by means of rivets 7, is a felly bridge 8 which extends circumferentially beyond the ends of the removable rim section 2. The felly bridge is adapted to be received in the circumferential channel of the well known form of metal felly 9 with which the wheel is shown as provided.

Each of the rim sections is formed with oppositely disposed circumferential flanges 10 for receiving a tire between them, the said flanges being integrally united by intervening base portions 11 of the respective rim sections. The base portion 11 of the detachable rim section 2 extends circumferentially somewhat beyond the ends 6 of the flanges 10 so as to form a rim member extension 12 which may advantageously be of T shape. The base portion 11 of the major rim section 2 at the end 4 of said rim section is provided with a corresponding open ended T-shaped slot 13 for receiving and interlocking with the headed projection 12 of the detachable rim section. Adjacent the slot 13, but circumferentially spaced somewhat therefrom, is a lug or lip 14 which is rigidly secured to the principal rim section 1. The lug 14 is spaced from the base of the major rim section by suitable means, such, for example, as a filler block 15, the end of the lug 14 facing the detachable rim section being disposed in overhanging relation to the filler 15 so as to form a pocket or recess for the reception of the end portion 16 of the felly bridge which projects circumferentially beyond the neighboring basal extension 12 of the detachable rim section 2.

It will be observed that the overlapping portions 12 and 16 form a circumferential extension of the detachable rim section projecting beyond the adjacent flanges 10 of said section, the end of said extension being formed as faces disposed in stepped relation at unequal radial distances from the center of the rim; and it will also be observed that the abutting faces of the base plate 11 and of the spacing plate or filler 15 are reversely stepped. The stepping of these cooperating parts, together with the overhanging relationship of the felly bridge engaging lug 14, ensures that the manipulations of the detachable rim section necessary to permit the mounting and demounting of tires may be performed with ease and certainty without danger of any of the parts assuming improper relations, and this construction also results in firmly securing the neighboring ends of the rim section against relative radial or transverse movement both inwardly and outwardly. It will be appreciated also that the entry of the headed tongue 12 into the corresponding slot 13 of the major rim section prevents circumferential separation of these rim elements.

The circumferentially extending felly bridge is preferably formed from a suitable flat blank bent into channel form so as to provide spaced flanges 17 receivable in the channel of the wheel felly 9. The base portion 18 of the felly bridge is provided beyond the end 5 of the detachable rim section with an aperture or recess 19 to receive and permit the operation of a toggle member or bar 20 as well as the lug members 21 and 22, respectively, carried by the major rim section 1 adjacent the end 3 thereof. The toggle member 20 is pivotally mounted between the circumferential flanges 17 of the felly bridge 8 by means of a suitable pivot pin 23 passing through said flanges somewhat inwardly of the base portion 18 of the bridge. As is well illustrated in Figs. 3 and 4, it results from this construction that when the rim sections 1 and 2 are in assembled relation the toggle member 20 extends circumferentially from its pivot pin away from the end 3 of the principal rim section, and the studs or lugs 21 and 22 engage and interlock with the walls of the aperture 19 in the felly bridge so as to lock the neighboring ends 3 and 5 of the respective rim sections against lateral movement.

Outward radial movement of the detachable rim section 2 beyond its proper assembled position is prevented by the portion of the felly bridge 8 which overlaps the neighboring base portion 11 of the major rim section 1, while any possible inward radial movement of the detachable section 2 may be advantageously prevented by means of the locking member 24 adapted to engage and interlock with the grooved stud or projection 22 carried by the rim member 1. The locking member 24 is preferably slidably mounted upon the end of the felly bridge, being slotted as at 25 to permit it to slide back and forth on a rivet 26 by which it is secured to the said bridge 8. The end 27 of the lock 24 which engages the stud 22 of the rim is recessed or bifurcated so as to embrace the stud 22 within the groove or channel thereof, thus enabling the locking member to interlock with the said stud.

The detachable rim section 2 and the connected felly bridge 8, together with the bar 20 pivotally mounted upon the latter, constitute a toggle mechanism enabling the detachable rim section to be easily and conveniently forced to assembled relation in the gap of the major section 1 so as to complete the rim. In order to ensure against slippage when the toggle mechanism is being operated to force the detachable rim section 2 into assembled position, the free end 28 of bar 20 may advantageously be forked or slotted so as to straddle a portion of the lug 22 upon the rim section 1 which forms an abutment for the pivoted member 20 during the operations of bringing the detachable rim section into assembled position or disassociating it from the major rim section 1.

The base 18 of the felly bridge 8 is provided intermediate its ends with an opening 29 for receiving the valve stem of a tire, and one of the rim sections is provided with a corresponding registering opening 30 for a similar purpose. Each of the circumferential flanges 17 of the felly bridge is formed with a plurality of corresponding oppositely disposed openings 31 adapted to receive a transversely extending rim bolt, such as 32, for forming a connection with the felly 9. The valve stem opening 29 in the base of the felly bridge is circumferentially interposed between a plurality of the bolt receiving openings 31 and they are so positioned with respect to said valve stem opening as to be suitable for receiving a rim bolt adapted to cooperate with any standard form of wheel now in general use. By forming the felly bridge with a valve stem receiving opening it is possible to produce economically an entirely practical demountable rim adapted for universal application to all common makes of wheels.

I claim:—

1. A tire supporting rim comprising a major rim section having a gap therein, a detachable rim section adapted to fill said gap to complete said rim, each of said rim sections having oppositely disposed circumferential flanges united by an intervening base portion, and means movably attached to one of said rim sections and adapted to engage the other rim section for constituting with said detachable rim section a toggle mechanism operable to force said detachable rim section into said gap, said detachable rim section having a circumferentially disposed extension projecting beyond the adjacent ends of the flanges of said detachable section and formed with a plurality of end faces arranged at unequal radial distances from the center of the rim and in stepped relation, and said major rim section having its base portion provided with a slot for receiving a portion of said extension in circumferential alignment with the said end face which is farthest from the center of the rim and also having on its inner side a lip spaced circumferentially from said slot and radially from the base portion of the major rim section to thereby form a recess for receiving a portion of said extension in circumferential alignment with the said end face which is nearer the center of the rim, said lip and said extension constituting means for interlocking the adjacent ends of said rim sections so as to prevent relative radial and transverse movements thereof.

2. A tire supporting rim comprising a major rim section having a gap therein, a detachable rim section adapted to fill said gap to complete said rim, a felly bridge secured to said detachable rim section and extending circumferentially beyond the ends thereof, a toggle member pivotally mounted upon said felly bridge beyond one end of said detachable rim section and constituting with said bridge a toggle mechanism operable to force said detachable rim section into said gap, an abutment on the inner face of said major rim section for cooperating with said pivotally mounted toggle member, and an abutment on said major rim section for cooperating with a portion of said felly bridge extending beyond the adjacent end of said detachable rim section, said felly bridge and one of said rim sections being formed with aligned holes adapted to receive a valve stem, and said bridge being provided with a plurality of circumferentially spaced openings each adapted to receive a transversely extending rim bolt for forming a connection with a wheel.

3. A tire supporting rim comprising a major rim section having a gap therein, a detachable rim section adapted to fill said gap to complete said rim, a circumferentially extending felly bridge secured to said detachable rim section and a pivotally movable member cooperating with said bridge to form a toggle mechanism operable to force said detachable rim section into said gap, said felly bridge being formed with an aperture adapted to receive a valve stem and being provided with a plurality of circumferentially spaced openings each adapted to receive a transversely extending bolt for forming a connection with a wheel, said valve stem receiving aperture being circumferentially interposed between a plurality of said bolt receiving openings.

4. A tire supporting rim comprising a major rim section having a gap therein, a detachable rim section adapted to fill said gap to complete said rim, a circumferentially extending felly bridge secured to said detachable rim section, and a toggle member cooperating with said bridge to form a toggle mechanism operable to force said detachable rim section into said gap, said bridge being formed with an opening adapted to receive a valve stem and having a plurality of circumferentially extending flanges between which said toggle member is pivoted, each of said flanges being provided with a plurality of corresponding circumferentially spaced openings adapted to receive a transversely extending rim bolt for forming a connection with a wheel.

5. A tire supporting rim comprising a major rim section having a gap therein, a detachable rim section adapted to fill said gap to complete said rim, a circumferentially flanged felly bridge secured to said detachable rim section and extending beyond the ends of the latter, a member pivotally mounted on said bridge and constituting therewith a toggle mechanism operable to force said detachable rim section into said gap, said bridge being recessed to permit said pivotally mounted member to swing outwardly so as to engage said major rim section preliminary to forcing said detachable rim member into said gap, and cooperating relatively movable members respectively mounted on said major rim section and said bridge for locking said detachable rim section to said major rim section, one of said relatively movable members being movable with respect to the part upon which it is mounted.

6. A tire supporting rim comprising a major rim section having a gap therein, a detachable rim section adapted to fill said gap to complete said rim, a felly bridge secured to the inner side of said detachable rim section and projecting beyond an end thereof, a toggle member pivotally connected to said felly bridge beyond the end of said detachable rim member and cooperating with said bridge to constitute means for forcing said detachable rim section into said gap, said major rim section being provided with a projection, said bridge being formed with an opening through which said projection extends when said detachable rim section fills said gap, and means movably mounted on said bridge for engaging said projection to lock adjacent ends of said rim sections together through the intermediacy of said bridge.

7. A tire supporting rim comprising a major rim section having a gap therein, a detachable rim section adapted to fill said gap to complete said rim, a felly bridge rigidly secured to said detachable rim section and adapted to overlap said major rim section, and a member pivotally mounted on said felly bridge beyond the end of said detachable rim section and cooperating with said bridge to form toggle mechanism for forcing said detachable rim section into said gap, said major rim section being provided on the inside with a plurality of projections one of which is adapted to form an abutment for said pivotally mounted member and at least one of which is adapted to extend into an opening in said bridge to lock abutting ends of said rim sections against transverse movement with respect to each other.

8. A tire supporting rim comprising a major rim section having a gap therein, a detachable rim section adapted to fill said gap to complete said rim, a continuous felly bridge rigidly secured to said detachable rim section and extending circumferentially beyond the ends of the latter, said bridge being provided with an opening adapted to receive a valve stem and having a circumferentially extending flange formed with a plurality of openings respectively adapted to receive a transversely extending bolt for forming a connection with a wheel, said valve stem opening being circumferentially interposed between a plurality of said bolt receiving openings, and a member pivotally mounted on said felly bridge and constituting therewith a toggle mechanism for forcing said detachable rim section into said gap, said bridge being formed with a recess for receiving said pivotally mounted member and being provided with means adapted to be moved into engagement with said pivotally mounted member to retain the latter in locked relation to said rim sections.

In testimony whereof I affix my signature.

EDGAR L. AVERA.